Feb. 13, 1951  H. C. KEYSOR  2,541,769

SIDE BEARING

Filed July 31, 1946

*INVENTOR.*
HAROLD C. KEYSOR
BY
*ATTORNEY*

Patented Feb. 13, 1951

2,541,769

UNITED STATES PATENT OFFICE 2,541,769

SIDE BEARING

Harold C. Keysor, Chicago, Ill., assignor to American Steel Foundries, Chicago, Ill., a corporation of New Jersey Application July 31, 1946, Serial No. 687,367

19 Claims. (Cl. 267—3)

My invention relates to a shock absorbing mechanism and more particularly to the type which may be used as a side bearing for railway cars.

One object of my invention is to provide a side bearing which consists of relatively few parts, is of simple design, rugged construction and is efficient in use.

My invention further comprehends a type of side bearing which will offer smooth resistance to the car body roll and prevent the development of synchronous yawing of the car body.

My invention also contemplates a novel side bearing comprising a novel housing, a friction unit within said housing supported upon a base plate and including a wedge fixed to said plate and another wedge slidably interlocked with said plate, and a spring urging said wedges apart and into frictional engagement with said housing.

I have invented a side bearing in which the working parts are encased within a housing to protect them from large particles of dirt which may otherwise lodge between said parts and cause malfunctioning of the bearing.

Other objects and details will be more apparent from the description and the associated drawings wherein.

Figure 1:
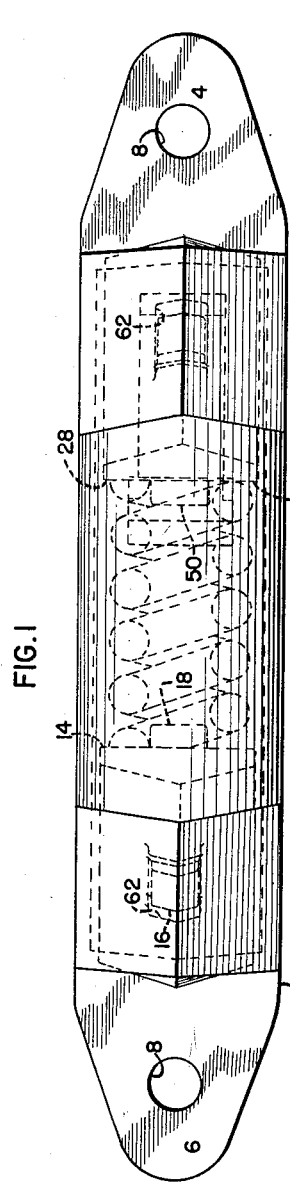
Figure 1 is a top plan view of my novel shock absorbing device.

My novel device comprises a base plate or support member 2 having at its ends securing lugs 4 and 6 with the central openings 8, 8 therein for reception of securing bolts or studs.

Integrally formed at one end of the base plate 2 adjacent said lug 6 is the wedge, abutment or friction member 10 consisting of a solid body of metal generally triangular in form and having the diagonal V-shaped outer friction face 12 and the vertical inner face 14. Projecting from said diagonal face 12 is the integral centrally disposed retaining lug 16 provided for a purpose hereinafter described, and centrally formed on the flat vertical face 14 is the spring-positioning stud 18.

Figure 4:
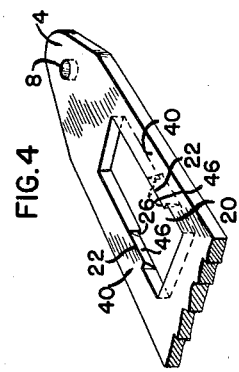
Figure 4 is a fragmentary perspective view of a base plate used in my novel structure.
Figure 3:
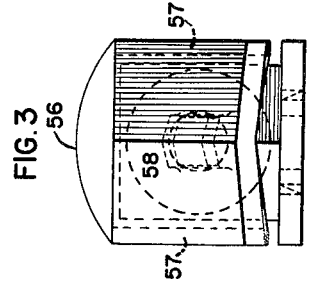
Figure 3 is an end view of the structure shown in Figures 1 and 2, the view being taken from the right as seen in those figures.

Referring now to Figure 4, it may be noted that the base plate 2 has a vertical opening or slot 20 therein, said opening extending lengthwise from approximately the center of said plate and terminating near the juncture between said plate and said lug 4. It may also be noted that the slot 20 is of different widths throughout the length thereof and that the said slot is in part defined by the tapered ledges 22, 22 at opposite sides thereof, said ledges extending from the widest portion of the slot to the stops 26, 26 on the base plate provided for a purpose hereinafter described.

Figure 5:
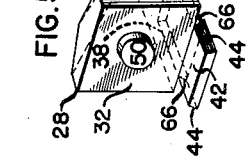
Figure 5 is a perspective view of the movable wedge used in my novel structure.

The detailed structure of the movable wedge, abutment or friction member 28 is illustrated in Figure 5 and consists of, in general, a solid body of metal substantially triangular in form and having the base 30, the vertical inner face 32, and the diagonal V-shaped outer or friction face 34.

On the base 30 is provided the integral central locking member 36 extending through said opening 20 in the base plate and having a guiding portion designated 38 abutting the sides of said slot and guiding said wedge as it rides on the base plate as at 40, 40, said member also having the interlocking portion designated 42 projecting beyond said vertical face 32 of said wedge 28, said portion 42 being of slightly less width than the widest portion of said slot 20 and having the diagonal upwardly converging wedge surfaces 44, 44 complementary in form to the engaging surfaces 46, 46 on said ledges 22, 22, said portion 42 with said ledges forming a dove-tailing interlock. It may be noted that the lateral dimension of the interlocking member is such as to conveniently admit it within the opening 20, and that the longitudinal dimension of said member is less than the length of said slot, whereby said shoe is prevented from moving laterally on said plate and is slidable longitudinally relative thereto.

A spring 48 is compressed between said wedges for urging them apart and is positioned on the inner face 14 of the wedge 10 by means of the stud 18 at one end and is seated at the other end against the vertical face 32 of the wedge 28 and retained in position by the central stud 50 formed on said face 32.

Superposed over the assembly heretofore described is a trough-like housing or friction casing or follower 52 having a top or base web 54 with an arcuate outer face or seat 56 to which the load may be applied, said top web merging with the side webs 57, 57 at opposite sides thereof and the downwardly diverging end webs 58, 58 having the friction faces 60, 60 and the centrally disposed recesses or pockets 62, 62 on their inner surfaces, said surfaces being complementary in form to the already described wedge-engaging friction surfaces 12 and 34.

Figure 6:
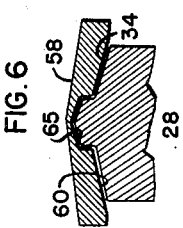
Figure 6 is a fragmentary sectional view taken in the plane substantially as indicated by the line 6—6 of Figure 2 and showing the interlocking means on the movable wedge and one of the end walls of the housing.

Projecting into one of said recesses 62 is the retaining lug 16 on the wedge 10 and fitted into the other opening 62 is the lug 64 on the wedge 28. It may be noted that the lugs 16 and 64 are identical and are substantially rectangular in cross section and have V-shaped outer faces engaging as at 65 (Figure 6) surfaces of complementary form in said pockets.

Figure 2:
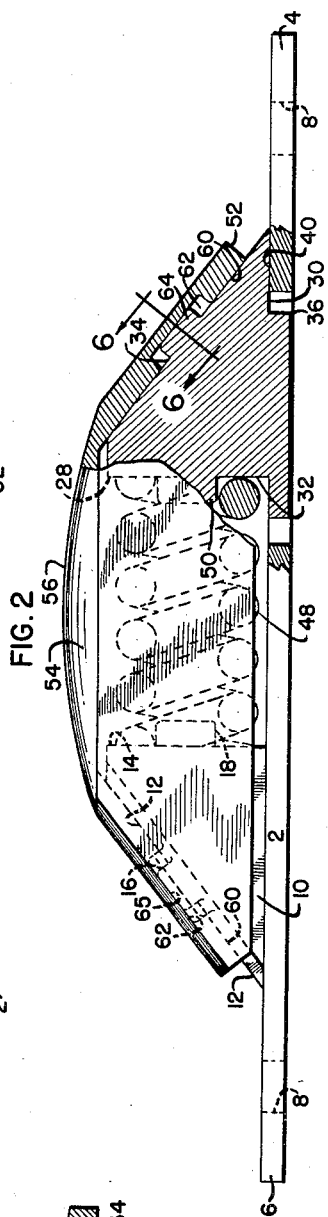
Figure 2 is a side elevation, partly in section, of my novel side bearing, showing the assembly of the movable wedge with the housing and the base plate.

To prevent the housing from moving laterally the pockets are rectangular in form and of slightly greater width than the retaining lugs associated therewith, and to allow the housing to move vertically the length of each pocket is substantially greater than the thickness of said lugs as may readily be observed in Figure 2.

To assemble my novel invention, the wedge 28 is interlocked with the base plate. The spring 43 is next compressed between the wedges and slipped over the respective positioning lugs. It may be noted that the longitudinal movement of the movable wedge on the base plate prior to assembly of the side bearing is restricted by means of the stops 66, 66 (Figure 5) on the interlocking member abutting against the stops 26, 26 on the base plate. The housing may then be forced over the wedges until the lugs 16 and 64 snap into their respective recesses 62, 62 completing the assembly of the side bearing, or the wedges may be forced together by any suitable power means and the housing may be slipped over the wedges and the wedges may then be released.

It may be observed that as a load is placed upon the housing, the housing slides upon the wedges compressing the spring and as the load is removed from the housing the shoes are urged apart by the spring compressed between them forcing the housing upwardly.

It is to be understood that I do not wish to be limited by the exact embodiment of the device shown which is merely by way of illustration and not limitation as various and other forms of the device will, of course, be apparent to those skilled in the art without departing from the spirit of the invention or the scope of the claims.

I claim:

1. A shock absorber comprising a housing substantially troughlike in form and having a top web, side webs merging with said top web at opposite sides thereof and integral end webs at the opposite ends thereof, said end webs converging upwardly, friction faces on the inner surfaces of said end webs, a base plate, a movable wedge on said plate operatively connected thereto and in frictional engagement with one of said faces, a fixed wedge on said plate in frictional engagement with the other face, resilient means compressed between said wedges and urging them apart and into said frictional engagement, a retaining lug on each of said wedges, and pockets in said faces slidably receiving said lugs, whereby said housing is movable vertically and is held against moving laterally.

2. In a shock absorber, a support element, spaced fixed and movable friction members thereon, a casing enclosing said members therein and in frictional engagement therewith along surfaces diverging toward said support element, and resilient means bearing against said members for urging them apart and into said engagement with said casing.

3. In a shock absorber, a base plate, fixed and movable friction elements thereon, spring means urging said elements apart, friction surfaces on the remote sides of said elements facing away from said plate, and a follower superposed on said surfaces and in complementary slidable engagement therewith for movement thereon toward and away from said plate.

4. In a shock absorber, a base plate, a fixed abutment on said plate adjacent to one end and having a diagonal friction face, a slidable abutment interlocked with said plate adjacent the opposite end and having a diagonal friction face, said friction faces on said abutments lying in upwardly converging planes, a spring between said abutments urging them apart, and a housing encasing said spring and abutments and in complementary frictional engagement with said faces.

5. A shock absorber comprising a base plate, an integral wedge adjacent to one end of said plate, a movable wedge slidably interlocked with said plate adjacent to the opposite end thereof, an outwardly extending lug on each of said wedges, a housing having pockets aligned with said lugs and receiving said lugs loosely therewithin, and a spring between said wedges urging said wedges apart and into frictional engagement with said housing and said lugs into said pockets.

6. A wedge comprising angularly related adjacent sides defining a spring seat and a base, respectively, a side opposite said angularly related sides defining a V-shaped diagonal friction surface, guide means on said base for guiding said wedge on an associated part comprising a boss with guide surfaces thereon, said boss having a portion projecting beyond the end of said base adjacent said seat, and laterally extending wedge projections on opposite sides of said portion having wedge surfaces on the sides thereof adjacent said seat and converging in a direction toward the plane of said base.

7. In a shock absorber, a base plate, a fixed abutment thereon, a slidable abutment interlocked therewith, a spring compressed between said abutments and urging them apart, interengaging stop means on said slidable abutment and said plate restricting the action of said spring in urging said abutments apart, and a housing encasing said abutments and said spring and in frictional engagement with said abutments.

8. In a shock absorber, a base member, spaced wedge elements thereon, resilient means between said elements for urging them apart, friction surfaces on the remote sides of said elements converging away from said member, and a hollow friction member movable toward and away from said member enclosing said elements therewithin and in complementary slidable engagement with said elements along said surfaces.

9. In a shock absorber, a base plate, fixed and movable wedges thereon, a spring compressed between said wedges and urging them apart, and a follower frictionally engaging the outer sides of said wedges along V-shaped diagonal surfaces.

10. In a shock absorber, a base plate, a fixed wedge on said plate adjacent to one end, a sliding wedge interlocked with said base plate adjacent to the opposite end, a spring compressed between said wedges to urge them apart, and a housing enclosing said wedges and said spring and in frictional engagement with said wedges, and interlocking means on said wedges and said housing.

11. A shock absorber device comprising a friction casing, a base plate, fixed and movable friction elements thereon telescoped within the casing and in frictional engagement therewith, and spring means reacting between said elements urging them apart, said elements engaging said casing along surfaces diverging toward said base plate and in spreading apart causing said casing to move away from said plate thereby expanding the device.

12. A shock absorber comprising a base plate having fixed and slidable wedges mounted thereon, compression spring means disposed between and reacting against said wedges for yieldingly resisting movement of the slidable wedge toward the fixed wedge, and a follower in wedge engagement with said wedges along surfaces of respective wedges converging from said plate.

13. A shock absorber including a base plate having a wedge fixed thereon, a friction surface on said plate extending toward said wedge, another wedge slidably engaging said surface for movement therealong toward and away from said fixed wedge, a follower in engagement with said wedges along converging surfaces arranged diagonally with respect to said friction surface, whereby movement of the follower toward said plate effects movement of said other wedge along said friction surface, and spring means disposed between and reacting against said wedges for resisting said last-mentioned movement of said other wedge.

14. In a shock absorber, a base plate, fixed and movable abutments on said plate, means on said plate and said movable abutment for guiding the movement of said movable abutment, a spring compressed between said abutments, and a housing encasing said abutments and said spring and in frictional engagement with said abutments along diagonal surfaces converging in a direction away from said plate.

15. In a side bearing, an elongated casing comprising an arcuate top web, angularly related diagonal end walls at opposite ends of said web, side webs at opposite lateral edges of said web, a base plate spaced from the casing, friction means on said plate telescoped within said casing comprising a pair of members in complementary engagement with the internal sides of said end walls, and a coil spring extending lengthwise of said casing and bearing at opposite ends thereof against said members for urging them apart to maintain the same against said walls.

16. A shock absorber friction casing comprising a hollow member including an elongated arcuate base web, diagonal end walls at opposite ends of said casing connected to corresponding ends of said web, said end walls having internal friction surfaces lying in planes converging toward said base web, and spaced side walls at opposite sides of said casing merging with the lateral edges of said end walls and said web.

17. In a shock absorber, a base plate, fixed and movable friction elements thereon, each of said friction elements being substantially triangular in side elevation and comprising angularly related sides forming a base and a spring seat and a diagonal side providing a friction surface, the base of said fixed element being integral with said plate, a guide boss on the base of said movable element fitted into a complementary slot within said plate for guiding the movement of said movable element on said plate, said boss having an extension adjacent the seat on the associated element and in complementary engagement at its lateral edges with adjacent portions of said plate at opposite sides of said slot along faces converging toward the plane of the base of said movable element, resilient means compressed between the seats on respective elements, and a friction casing surrounding said elements and in wedge engagement therewith on the diagonal sides thereof.

18. In a shock absorber, a housing, a base plate, fixed and slidable transverse abutments on said plate within said housing, and resilient means compressed between said abutments and urging them apart and into frictional engagement with said housing, said housing and abutments engaging each other along diagonal surfaces diverging toward said plate.

19. A shock absorber comprising a base plate having fixed and movable wedges thereon, a follower in wedge engagement with said wedges along surfaces of respective wedges converging from said plate, and resilient means cooperating with said wedges to yieldingly resist movement of said movable wedge in one direction relative to said fixed wedge and maintaining said wedges in said engagement with said follower.

HAROLD C. KEYSOR.

REFERENCES CITED

The following references are of record in the file of this patent:

UNITED STATES PATENTS

| Number | Name | Date |
| --- | --- | --- |
| 754,594 | McKeen | Mar. 15, 1904 |
| 757,841 | Ritter | Apr. 19, 1904 |
| 1,179,755 | Price et al. | Apr. 18, 1916 |
| 1,788,130 | Symington | Jan. 6, 1931 |
| 2,197,783 | Barrows | Apr. 23, 1940 |
| 2,360,190 | Bachman | Oct. 10, 1944 |
| 2,360,262 | Oelkers | Oct. 10, 1944 |
| 2,379,078 | Haseltine | June 26, 1945 |
| 2,388,230 | Light | Oct. 30, 1945 |